May 21, 1935. S. BULLUM 2,002,337
FEEDING DEVICE
Filed March 27, 1933 2 Sheets-Sheet 1

Inventor
Stephen Bullum
By Jack A. Ashley
Attorney

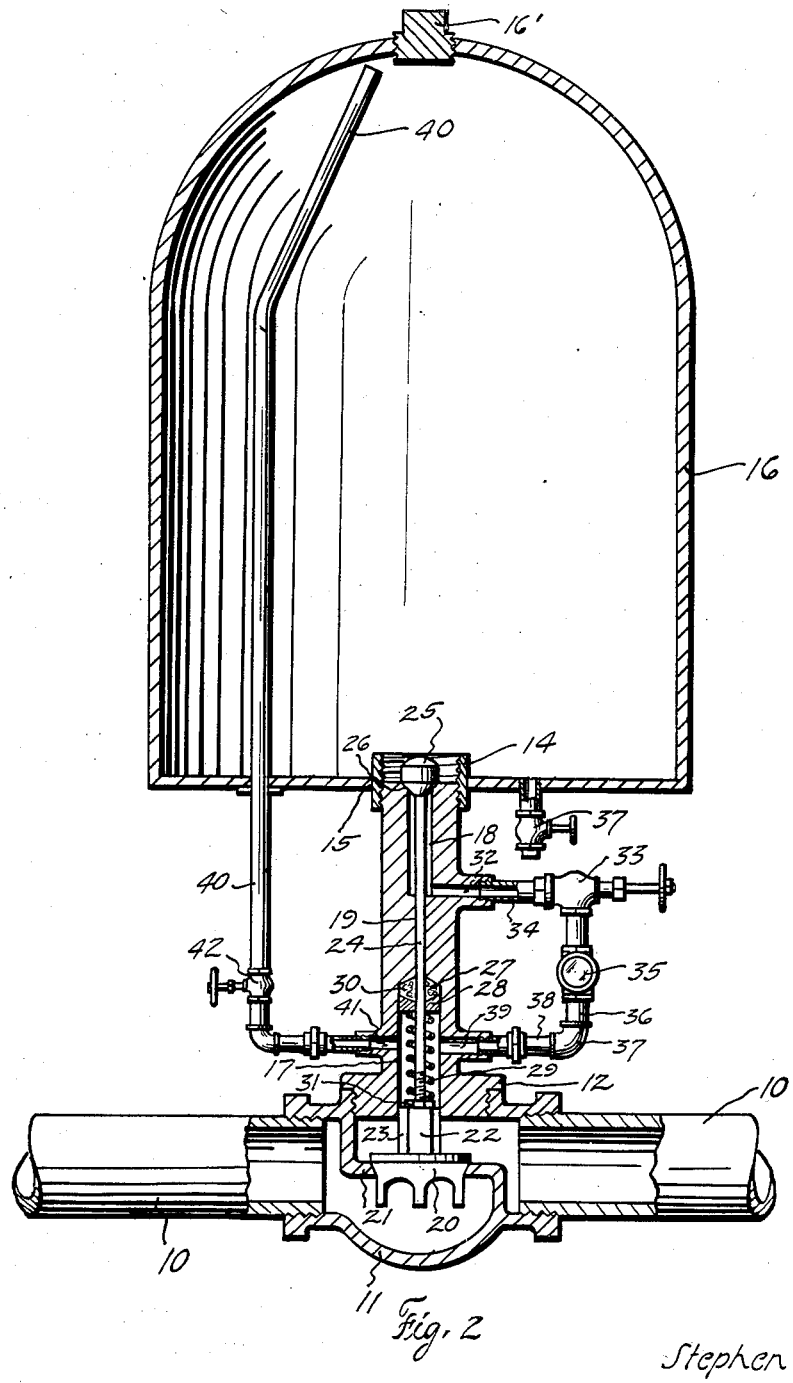

Patented May 21, 1935

2,002,337

UNITED STATES PATENT OFFICE 2,002,337

FEEDING DEVICE

Stephen Bullum, Overton, Tex., assignor of one-half to Jon R. Long, Fort Worth, Tex., and one-half to Wallace Davis, Houston, Tex.

Application March 27, 1933, Serial No. 662,992

9 Claims. (Cl. 137—165)

This invention relates to new and useful improvements in feeding devices.

One object of the invention is to provide an improved liquid feeding device having means for controlling the amount of liquid fed into a conductor or chamber in proportion to the pressure fluid passing therethrough or admitted thereto.

Another object of the invention is to provide an improved feeding device having a valve which is operated by the pressure of the fluid into which the liquid is fed.

A further object of the invention is to provide a feeding device having improved means for preventing the liquid to be fed and the fluid into which the liquid is fed from by-passing the feeding means, and interfering with a regulated feed.

A still further object of the invention is to provide, in a gravity feeding device having a valve for controlling the flow of a pressure fluid into which the device feeds a liquid, improved means for regulating the operation of said valve, whereby a predetermined pressure is required to open said valve and whereby said valve is positively closed upon a predetermined drop in such pressure.

Another object of the invention is to provide an improved feeding device having a pair of valves connected by a rod, one valve controlling the flow of pressure fluid and the other valve controlling the liquid supply, whereby the operation of the one valve will operate the other, so that when the pressure fluid is cut off or its pressure decreases, the liquid supply is cut off, and, similarly, when the pressure fluid is flowing, the liquid is fed thereto.

Still another object of the invention is to provide an improved feeding device having a pair of valves which operate simultaneously, one controlling the flow of pressure fluid into which the device feeds a liquid, the other controlling the liquid supply and a regulator, through which the liquid must pass, mounted between the valves, thereby giving a positive cut-off of feed to the regulator and also a positive cut-off below the regulator and the source of the pressure fluid.

A construction designed to carry out the invention will be hereinafter described, together with other features of the invention.

Figure 1:
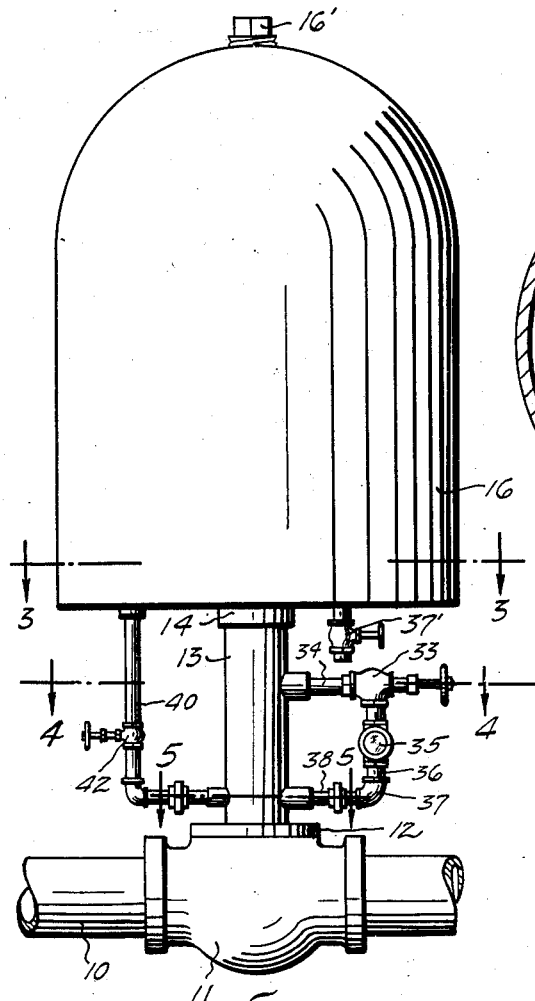
Figure 3:
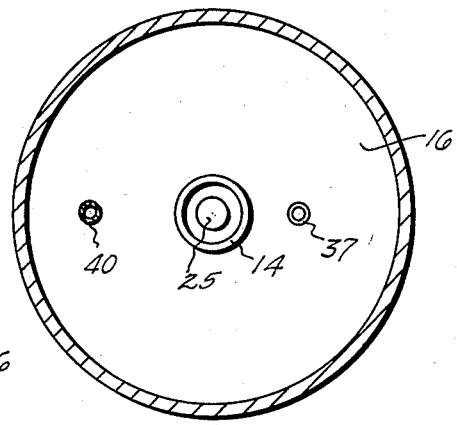
Figure 5:
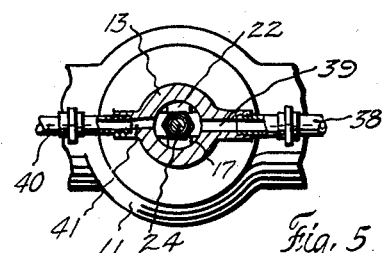
Figure 6:
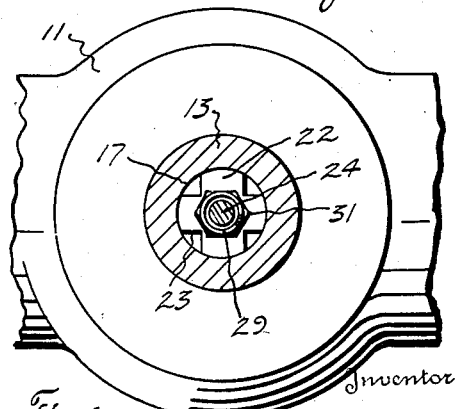
Figure 4:
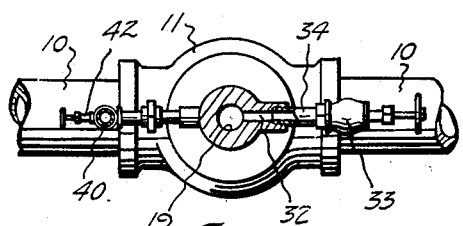

The invention will be more readily understood from a reading of the following specification and by reference to the accompanying drawings in which an example of the invention is shown, and wherein:

Figure 1 is a side elevation of a feeding device constructed in accordance with the invention, Figure 2 is a vertical sectional view of the same, Figure 3 is a horizontal cross-sectional view taken on the line 3—3 of Figure 1, Figure 4 is a horizontal cross-sectional view taken on the line 4—4 of Figure 1, Figure 5 is a horizontal cross-sectional view taken on the line 5—5 of Figure 1, and Figure 6 is an enlarged horizontal cross-sectional view, similar to Figure 5, and showing the lower valve construction.

In the drawings the numeral 10 designates a pipe line which has a valve case 11 connected therein, in the usual manner. The case has a cap 12 screwed thereinto and a standard 13, integral with said cap, extends upwardly therefrom. The upper end of the standard screws into a collar 14 which is secured by welding, soldering, or in any other suitable way, in an opening 15 in the bottom of a container 16. The container may be of any desired shape or size, and it is seen that with the parts assembled as shown in the drawings, the standard 13 supports the container above the valve case and the pipe line.

The standard 13 is provided with a lower bore 17 and an upper bore 18 connected by a reduced axial bore 19. The upper bore 18 has direct communication with the interior of the container 16. A valve 20 is positioned within the valve case 11 and is arranged to engage a valve seat 21 to stop the flow of fluid through the line 10. The valve is provided with a shank 22, which is slidable in the lower end of the bore 17. Vertical channels or grooves 23 in the shank serve to connect the interior of the bore 17 with the valve case above the valve. A valve stem 24 extends upwardly from the shank 22 into the bore 17, and has a sliding fit in the reduced bore 19. The upper end of the stem extends through the upper bore 18 and carries a valve 25, which is arranged to engage a vave seat 26 provided at the upper end of the bore 18. It will be seen that the reduced bore 19 serves as a guide for the valve stem 24. The valves 20 and 25, being connected by said stem, are incapable of individual movement and it is obvious that the operation of one will operate the other.

Suitable packing 27 surrounds the stem 24 and is held at the upper end of the bore 17 and against the lower end of the reduced bore 19 by a packing gland 28 which is supported by a spring 29, whereby a suitable stuffing box is formed. The lower end of the spring engages a nut 31 which is threaded on the lower end of the stem 24. The stuffing box 30 provides an effective seal to prevent passage of fluid from the bore 17 into the bore 19, or vice versa. As the packing wears the nut 31 may be raised on the stem, whereby the tension on the spring is increased to force the gland 28 upwardly. It is pointed out that the increased spring tension will also make it necessary that a greater pressure be exerted on the valve 20 to raise the same.

At the lower end of the upper bore 18 a lateral port 32 is provided. A manually operated regulating valve 33, preferably of the needle type, is connected with the port 32, by a short pipe 34. A sight glass 35 is connected to the lower end of the valve 33 and a pipe 36 extends from its lower end. An elbow 37 is secured to the lower end of the pipe 36 and a short pipe 38 connects the elbow with a lateral port 39 extending outwardly through the standard 13 from its lower bore 17. Thus, it is seen that the upper bore 18 and the lower bore 17 are connected and the regulating valve 33 is positioned therebetween. A suitable vent pipe 40 has its lower end communicating with the lower bore 17 through a lateral port 41 opposite the port 39. The pipe extends upwardly within the container 16 terminating adjacent the top thereof. A suitable control valve 42 is provided in the pipe. This pipe serves to equalize the pressure above and below the fluid or chemical in the container, whereby a gravity flow of the same is possible.

The chemical, or other liquid to be introduced into the line to treat the pressure fluid therein, is placed in the container 16 through an opening in the top of said container. A plug 16' closes this opening to provide a sealed, air-tight container. A suitable drain 37' is secured in the bottom of said container. The feeding of the chemical into the pipe line is controlled by the valves 20 and 25.

In operation, the tension of the spring 29 on the valve 20 is fixed by adjusting the nut 31 on the stem 24, whereby a certain amount of fluid pressure in the line is necessary to raise said valve. When this pressure is attained, the valve 20 is lifted to allow the pressure fluid to flow through the line. Due to the stem 24 rigidly connecting the valve 20 with the valve 25, the lifting of the former will raise the latter from its seat 26, whereby the liquid in the container will flow downwardly into the upper bore 18.

It is pointed out that the collar 14, into which the upper end of the standard is screwed, extends above the bottom of the container 16. As the liquid flows into the upper bore 18, this collar prevents sediment and dirt from being washed onto the valve seat or into the flow line of the liquid, and thereby prevents any inefficiency of the feeder due to this cause. The liquid may seep downwardly in the reduced bore 19, but the stuffing box 30 will prevent it from entering the lower bore 17 in this way.

The only outlet from the upper bore 18 is through the lateral port 32 at the lower end thereof. Thus, the liquid will enter the pipe 34 and will pass through the manually operated regulating valve 33 and through the sight glass 35. The provision of the glass allows an observer to ascertain the amount of liquid passing through the feeder, and it is obvious that through the medium of the valve 33 adjustment may be made whereby a proper amount of liquid is allowed to pass through the feeder to the line at all times.

The liquid, after passing through the sight glass 35, flows through the pipe 36, elbow 37, pipe 38 and port 39, and into the lower bore 17. From the lower bore, it flows downwardly through the vertical channels 23 in the shank 22 and into the pipe line, where it mixes with the pressure fluid passing therethrough. When the fluid pressure decreases to such an extent that the tension of the spring is sufficient to overcome said pressure, the valve 20 will be forced downwardly against its seat 21 to stop the flow of fluid passing through the line. At the same time, the valve 25 at the upper end of the stem 24 is seated, whereby the liquid supply is cut off. Any gas in the line 10 which passes upwardly into the lower bore 17 cannot seep by the stuffing box 30 to work its way upwardly through the reduced bore 19 and through the upper bore 18, to enter the container 16 upon the following operation of the valves 20 and 25.

It is seen that the feeding operation is entirely automatic, the fluid pressure in the line controlling the raising or lowering of the valves. When fluid is passing through the line, the liquid is introduced therein. When the flow of pressure fluid in the line is stopped, the liquid supply is cut off. Since the liquid does not depend on a built up pressure for injection into the line, but merely depends on gravitation, the introduction of said liquid is assured when the valve 25 is in its open position. The device is simple in construction, the valves 20 and 25 being the only moving parts. The operation is positive and efficient and all waste of the liquid is eliminated, since liquid is only supplied when fluid is flowing through the line.

The position of the regulating valve 33 is important. It is noted that it is mounted between the valves 20 and 25. When the valves have been raised to feed liquid, the liquid, as has been explained, passes through this valve. As soon as the valve 20 closes, the valve 25 is seated thereby immediately cutting off the liquid supply to the valve 33. Any liquid in the valve 33 or pipes 34, 36, or 38 will continue its downward flow into the interior of the valve case 11, but it is noted that the valve 20, being closed, will prevent this liquid from mixing with the pressure fluid and this liquid can only escape through the discharge end of the line. Although I have shown the device as applied to a pipe line, it is to be understood that the invention is not to be so limited, as the feeder could be used in combination with steam lubricating devices, or the like.

The description which has been given recites more or less detail of a particular embodiment of the invention, which is set forth as new and useful, however, I desire it understood that the invention is not limited to such exact details of construction, because it is manifest that changes and modifications may be made, within the scope of the appended claims, without departing from the spirit of the invention.

What I claim and desire to secure by Letters Patent, is:

1. A feeding device comprising, a container for a liquid to be fed, a valve case, a valve in said case, a liquid feeding conductor extending from the container to the valve case, a second valve for controlling the flow of liquid from the container to the feeding conductor connected with the first valve and operated thereby, and a stuffing box between the valves and through which the connection between said valves passes to prevent the liquid or the fluid from by-passing the liquid feeding conductor.

2. A feeding device comprising, a container for a liquid to be fed, a valve case, a valve in said case, a liquid feeding conductor extending from the container to the valve case, a second valve for controlling the flow of liquid from the container to the feeding conductor connected with the first valve and operated thereby, a regulator connected in the conductor for controlling the flow of the liquid from the conductor to the valve case, and a stuffing box between the valves to prevent the liquid or the fluid from by-passing the liquid feeding conductor.

3. The combination with a pressure fluid line, of a feeding device comprising a container for a liquid to be fed into said line, a valve case connected in said line, a valve in the case normally closed but arranged to be opened by the fluid pressure in the line, a liquid feeding conductor extending from the container to the valve case, a second valve for controlling the flow of the liquid from the container to the feeding conductor connected with the first valve and operated thereby, a valve in said liquid feeding conductor for regulating the amount of fluid to be fed into the line when said second valve is opened by the passage of fluid through the line, and means in said liquid feeding conductor whereby the amount of liquid supplied therethrough may be determined.

4. The combination with a pressure fluid line of a feeding device comprising, a container for a liquid to be fed into said line, a valve case connected in said line, a valve in the case and arranged to be operated by the fluid pressure in the line, a liquid feeding conductor extending from the container to the valve case, a second valve for controlling the flow of the liquid from the container to the feeding conductor connected with the first valve and operated thereby, a stuffing box between the valves and through which the connection between said valves passes for preventing the liquid or the fluid from by-passing the liquid feed conductor, and a regulator connected in the conductor for controlling the flow of the liquid from the conductor to the valve case.

5. A feeding device comprising, an upright container for a liquid to be fed entirely by gravity, a valve case spaced below the container, a valve positively seating in said case, a gravity liquid feeding conductor extending downwardly from the container to the valve case, a valve for controlling the flow of liquid by gravity from the container to the feeding conductor, connecting means between said valves whereby the valves are seated and unseated by the operation of the lower valve, means to prevent the passage of fluid along said connecting means and a regulator in the conductor for controlling the flow of the liquid from the container to the valve case.

6. A feeding device comprising, a container for a liquid to be fed entirely by gravity, a valve case, a lower valve in the case and arranged to be operated by a pressure fluid flowing through the valve case, a gravity liquid feeding conductor extending from the container to the valve case, a hopper valve for controlling the gravity flow of liquid from the container to the feeding conductor connected with the lower valve and operated thereby, means for positively closing the lower valve when the pressure of the fluid flowing through the valve case drops to a predetermined degree, means for regulating the operation of the lower valve, whereby a predetermined pressure of fluid is required to open said valve, and a stuffing box between the valves and through which the connection between said valves passes for preventing the liquid from by-passing the liquid feed conductor.

7. A feeding device for a horizontal pressure fluid line comprising, a valve case connected in said line, an upright support mounted on said case, an upright container for a liquid to be fed entirely by gravity mounted on said support, a lower valve in the valve case arranged to be operated by a pressure fluid flowing through said case, a gravity liquid feeding conductor extending from the container to the valve case, an upper valve for controlling the gravity flow of liquid from the container to the feeding conductor, a connection between said valves passing through said support, whereby the upper valve is operated by the lower valve, a stuffing box between the valves and through which said connection passes for preventing the liquid or the fluid from by-passing the liquid feed conductor, means for positively closing the lower valve when the pressure of the fluid flowing through the valve case drops to a predetermined degree, and means for regulating the operation of the lower valve, whereby a predetermined pressure of fluid is required to open said valve.

8. A feeding device for a horizontal pressure fluid line comprising, a valve case connected in said line and having inlets and outlets, an upright container for a liquid to be fed entirely by gravity, a valve in the valve case arranged to be operated by a pressure fluid flowing through said case, an upper valve carried and operated by the lower valve for controlling the flow of the liquid from the container, a gravity liquid feeding conductor mounted between the valves and extending from the container to the valve case, means for positively closing the lower valve when the pressure of the fluid flowing through the valve case drops to a predetermined degree, means for regulating the operation of the lower valve, whereby a predetermined pressure of fluid is required to open said valve, and a pressure equalizing pipe extending from the feed conductor into the upper portion of the container.

9. A feeding device for a horizontal pressure fluid line comprising, a valve case connected in said line, an upright support mounted on said case, an upright container for a liquid to be fed entirely by gravity mounted on said support, a lower valve in the valve case arranged to be operated by a pressure fluid flowing through said case, a gravity liquid feeding conductor extending from the container to the valve case, an upper valve for controlling the gravity flow of liquid from the container to the feeding conductor, a rod extending through the support and connecting the valves, whereby the valves are seated and unseated by the pressure fluid, a stuffing box through which the rod passes for preventing the liquid or the fluid from by-passing the liquid feed conductor, and a regulator in the conductor for controlling the flow of the liquid from the container to the valve case.

STEPHEN BULLUM.